United States Patent [19]

Hayashi

[11] Patent Number: 5,105,320
[45] Date of Patent: Apr. 14, 1992

[54] OPERATION MODE SWITCHING AND LOADING-EJECT MECHANISM FOR A TAPE PLAYER

[75] Inventor: Hideki Hayashi, Tokyo, Japan

[73] Assignee: Clarion Co., Ltd., Tokyo, Japan

[21] Appl. No.: 321,860

[22] Filed: Mar. 10, 1989

[30] Foreign Application Priority Data

| Mar. 15, 1988 | [JP] | Japan | 63-63033 |
| Jun. 7, 1988 | [JP] | Japan | 63-74806 |
| Jun. 7, 1988 | [JP] | Japan | 63-138290 |
| Jun. 7, 1988 | [JP] | Japan | 63-138291 |
| Jul. 15, 1988 | [JP] | Japan | 63-93598 |
| Jul. 15, 1988 | [JP] | Japan | 63-176428 |

[51] Int. Cl.⁵ .................. G11B 5/54; G11B 15/675
[52] U.S. Cl. ........................... 360/105; 360/96.5
[58] Field of Search ............ 360/105, 106, 96.1, 360/96.5, 96.6

[56] References Cited

U.S. PATENT DOCUMENTS

| 4,646,302 | 2/1987 | Ono | 360/105 |
| 4,748,523 | 5/1988 | Aldenhoven et al. | 360/96.3 X |
| 4,825,312 | 4/1989 | Yoshikawa et al. | |
| 4,858,042 | 8/1989 | Ito et al. | |

Primary Examiner—David J. Severin
Attorney, Agent, or Firm—Flynn, Thiel, Boutell & Tanis

[57] ABSTRACT

A tape player is disclosed, in which a shift member having a cam portion, in which each portion corresponds to each of the operation mode positions, is moved by a power gear driven by a motor, which shift member moves a head plate and a loading-eject mechanism, and further each of the operation mode positions is detected by the cam portion.

8 Claims, 16 Drawing Sheets

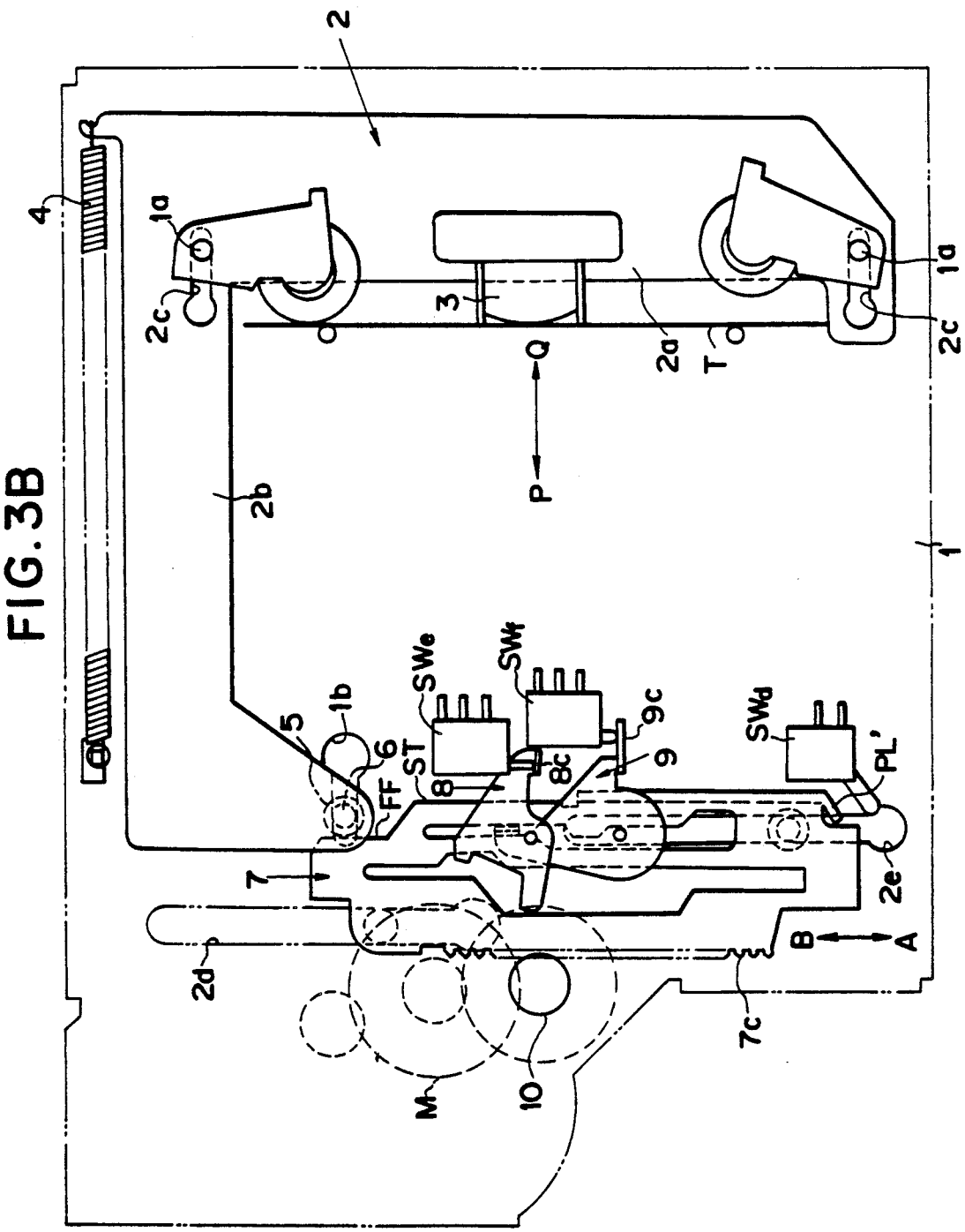

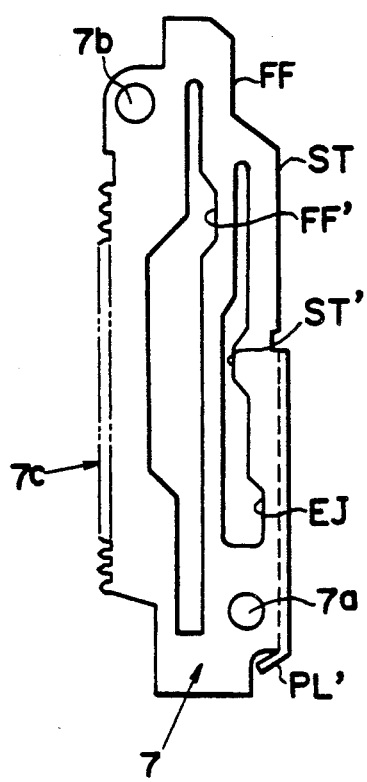
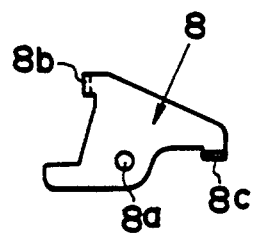
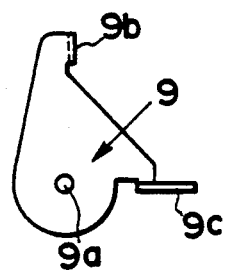
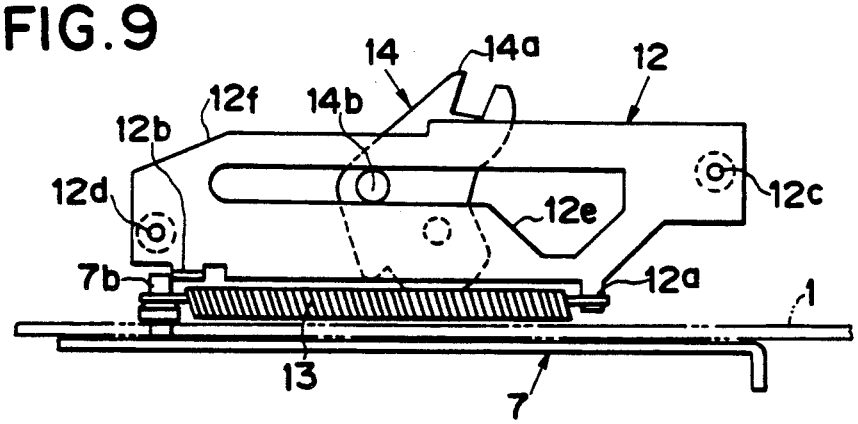
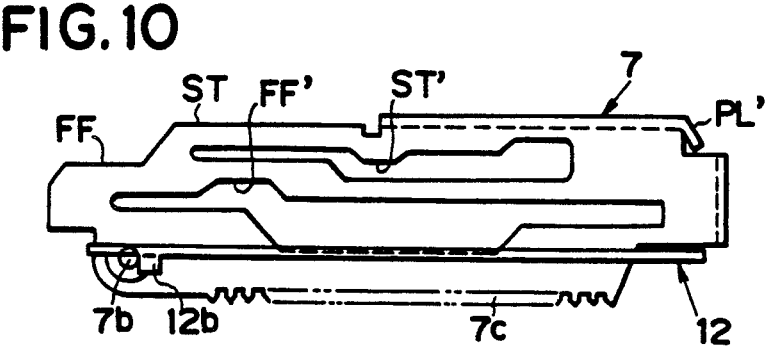

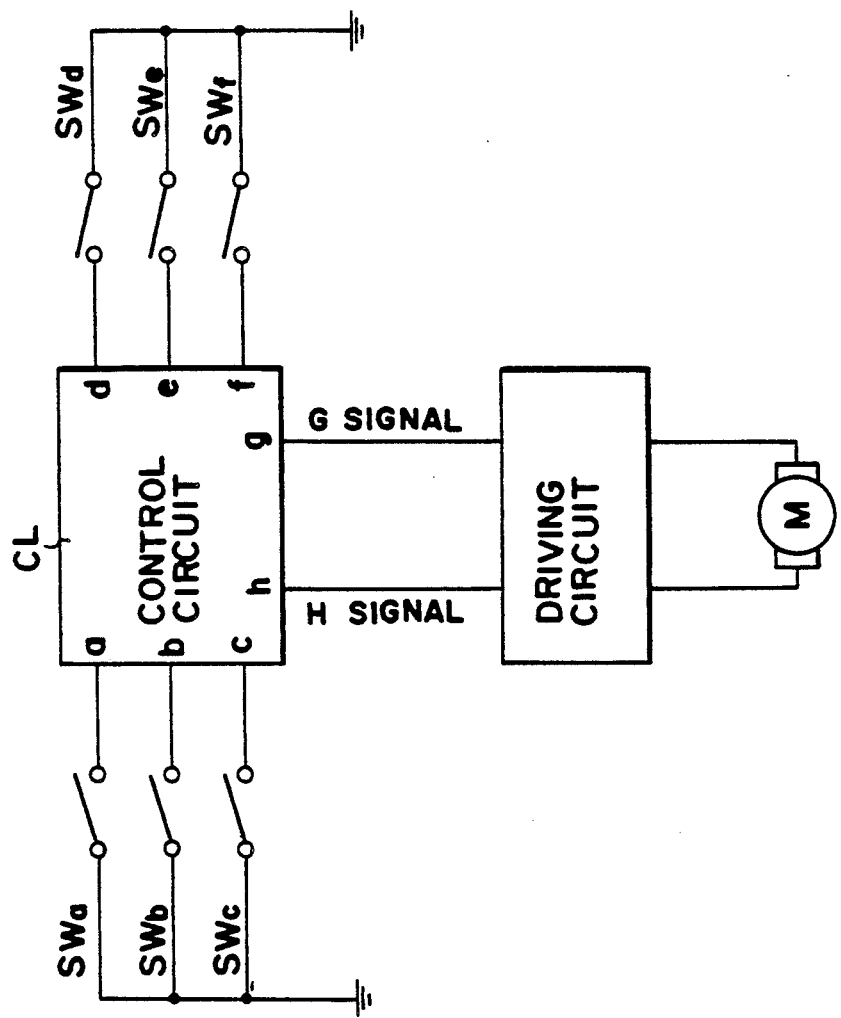

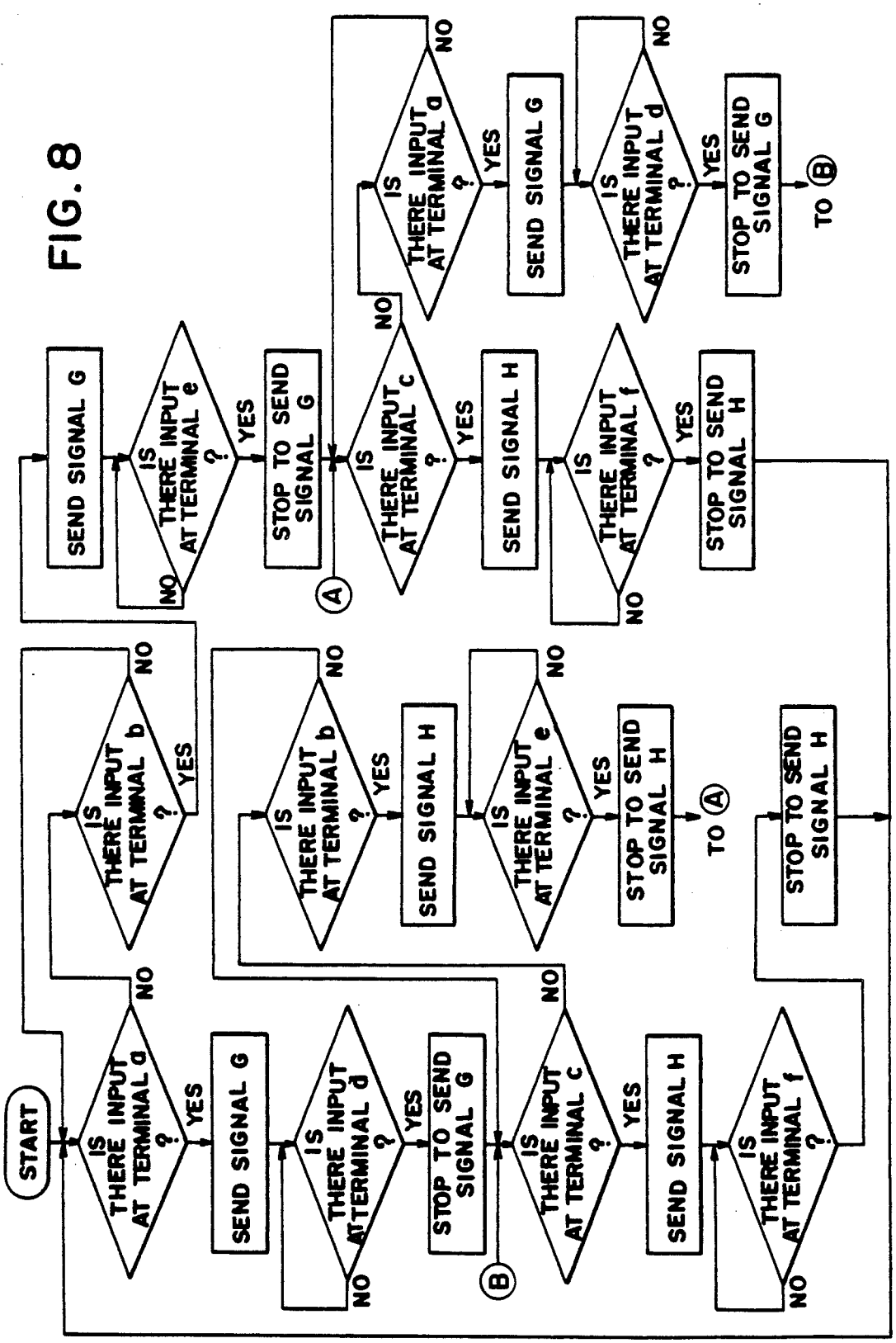

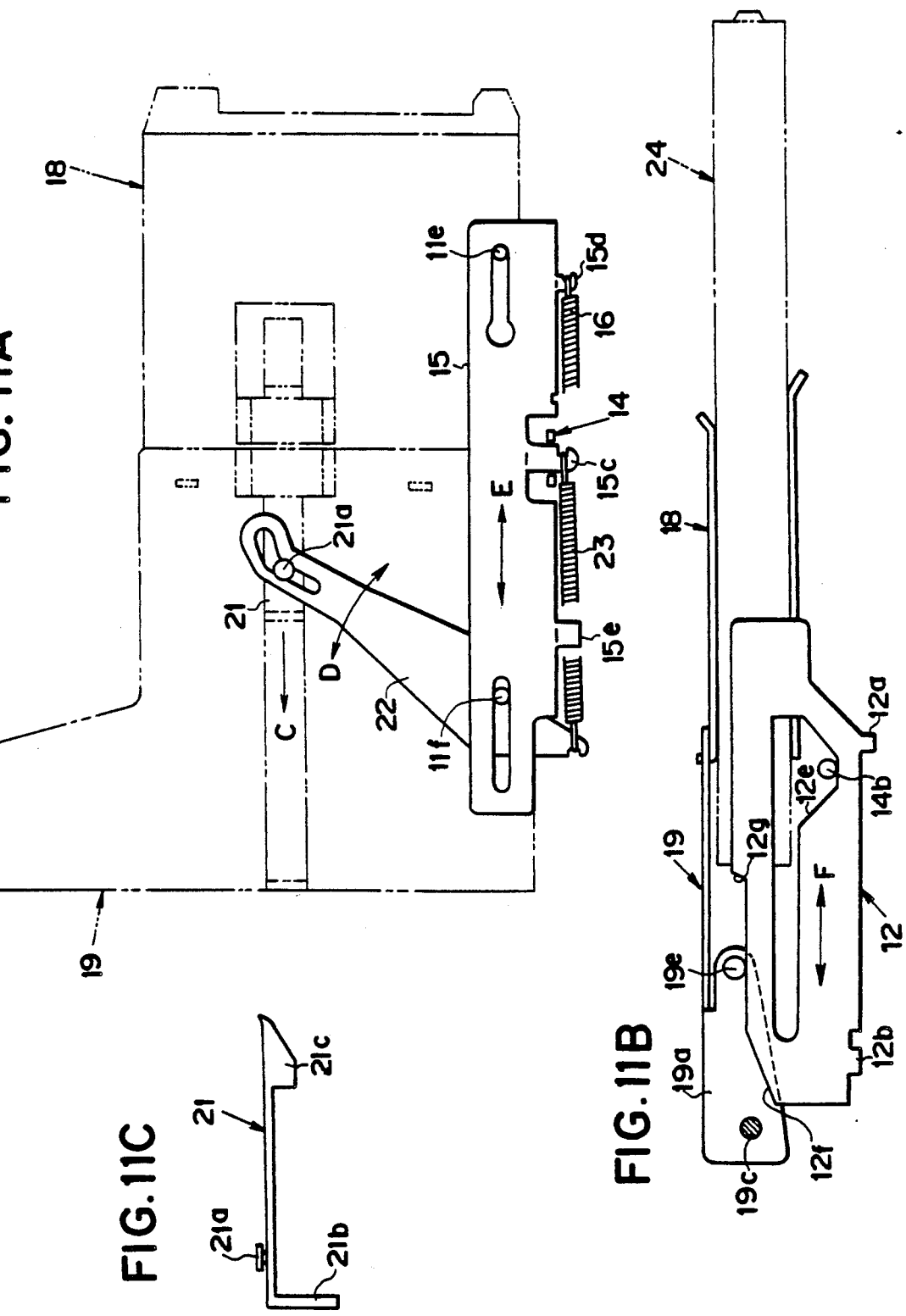

OPERATION MODE SWITCHING AND LOADING-EJECT MECHANISM FOR A TAPE PLAYER

FIELD OF THE INVENTION

This invention relates to a tape player and more in detail to an improvement made on the operation mode switching and loading-eject mechanism for the tape player.

BACKGROUND OF THE INVENTION

Heretofore, in a tape player, the loading-eject mechanism effecting loading-eject of a cassette and the mode switching mechanism moving a head plate according to the mode such as stop, play, fast-forward, etc. are driven by different members.

Further, for the mode switching mechanism, a mechanism is often used, by which different modes can be switched by a simple operation to push down a switch without using any manual operation force by performing holding and switching of the different modes by utilizing the attractive force of an electromagnetic plunger and the driving force of a motor.

Since a tape player automated as described above has a construction necessarily more complicated than that operated manually, it is desired to reduce the number of parts and in particular the numbers of plungers, for which the construction is more complicated and the number of fabrication steps is greater than the other parts.

Further a mechanism, in which a head plate is attracted and held by an electromagnetic plunger, has another problem that the retreat of the head plate at the eject is accompanied by production of retreat chock sound due to a return spring.

In addition, in a prior art mode switching mechanism, the head plate is moved, as the mode is changed such that play→stop→fast-forward (FF) for the mode switching from the play mode to the FF mode and FF →stop→play for the mode switching from the FF mode to the play mode. That is, the switching operation is not directly performed, but it is performed necessarily through the stop position.

Furthermore, as a cassette loading-eject mechanism in a prior art tape player, there is known a loading-eject mechanism using a torsion type inverted spring, as indicated in FIG. 22.

That is, in the figure, reference numeral 50 is a loading plate; 51 is a power gear for moving the loading plate; 52 is a return spring; 53 is a loading link; 54 is a torsion spring disposed on the loading link; 55 is a pack stopper; 56 is a pack guide for the cassette; 53a is an engaging hole formed in the loading link; 50a is a pin inserted therein and secured to the loading plate 50; 53b is a protrusion supporting the winding portion of the spring 54 stated above and disposed on the loading link 53; 53c is an engaging piece on the loading link side, which is engaged with a spring portion of the torsion spring 54; and 55a is an engaging pin disposed on the pack stopper The engaging pin 55a is inserted in an opening 53d formed in the loading link 53 and thrust to a peripheral side portion 53e of the opening 53d by the other spring portion of the torsion spring 54. In the operation of loading the cassette, when the loading plate 50 is moved in the direction indicated by an arrow G (FIG. 22 shows the state where the movement is terminated), the loading link 53 is rotated clockwise (in FIG. 22) together therewith and the pack stopper 55 is moved in the direction indicated by an arrow H by the torsion spring 54 stated above. In this way, a cassette (not shown in the figure) inserted in the pack guide 56 is pulled-in to the loading position in the inner most part thereof.

In the loading-eject mechanism described above, the movement of the pack stopper 55 is limited by a guide arm or an end portion of a chassis and errors in the mechanism are absorbed by over-push of the torsion spring 54 due to the fact that the loading link 53 is excessively moved, in order to assure the position of the moving cassette. However, in the case where the cassette is caught during the loading, the pack stopper is stopped and the loading link is moved against the torsion spring 54. After the engaging pin 55a has touched the peripheral side portion 54f of the opening 53d, the loading link 53 is stopped forcedly, which gives rise an inconvenience in the mechanism that the motor (not shown in the figure) driving the power gear 50 is stopped also forcedly.

Further, since the mounting position of the torsion spring 54 is at the engaging position between the loading link 53 and the pack stopper 55 (on the upper surface of the pack guide 56), it is different to construct the whole mechanism in a thin form.

Further, in the prior art tape player having the mode switching and loading-eject mechanism described above, operational position detecting means does not detect the play position and the FF position of the player, but detects the stop position and the eject position by means of different members. That is, for the stop position the retreated position of the head plate is detected by a switch and for the eject position the moving position of the eject plate is detected by another switch.

However, by the construction described above, concerning the play position and the FF position, it is not possible to detect whether the mode is really in one of these positions or not.

In addition, in the case where the operational position stated above is detected by means of a switch, since the switch can be located only near a respective operational member, this gives rise a drawback that not only a large space is required therefor but also wiring is complicated.

OBJECTS OF THE INVENTION

An object of this invention is to provide a tape player, in which the loading-eject mechanism and the mode switching mechanism are simplified in their function and it can be expected to reduce operation noise, and at the same time for particular mode positions direct mode switching is possible.

Another object of this invention is to provide a tape player, by which the mode can be switched directly to desired one without passing through the stop mode.

Still another object of this invention is to provide a tape player, in which each of the operational mode positions can be surely detected.

Still another object of this invention is to provide a tape player, which can protect safely the loading mechanism, even if the cassette is caught during the loading operation driven by a motor, and at the same time effect surely absorption of mechanical errors by means of a spring at the position where the movement at the loading is terminated.

SUMMARY OF THE INVENTION

In order to achieve the above objects, a tape player having a head plate supporting a magnetic head and disposed slidably and a power gear driven by a motor according to this invention is characterized in that there are disposed a shift member engaged slidably with the head plate, having cam portions corresponding to different operational mode positions of the tape player, and disposed movably and position detecting means for detecting that the shift member is moved by the power gear described above, the head plate is slid to a desired operational mode position, and the shift member described above is moved and has arrived to a desired operational mode position and that there is disposed further driving means for driving the cassette loading-eject mechanism by the movement of the shift member so that it can be detected that the shift member has arrived to the loading-eject position.

BRIEF DESCRIPTION OF THE DRAWINGS

FIGS. 3A, 3B and 3C are plan views illustrating three different mode positions of the mode switching mechanism;

FIG. 4 is a plan view of the mode plate;

FIGS. 5 and 6 are plan views of the link member;

FIG. 7 is a circuit diagram of the control circuit;

FIG. 8 is a flow chart thereof.

FIG. 9 is a side view illustrating a linking state of the mode plate and the loading-eject plate;

FIG. 10 is a plan view thereof;

FIG. 11A is a plan view of the loading mechanism at the cassette insertion;

FIG. 11B is a side view thereof;

FIG. 11C is a side view of a pack stopper;

FIG. 12A is a plan view of the loading mechanism at the cassette pull-in;

DETAILED DESCRIPTION

Figure 1:
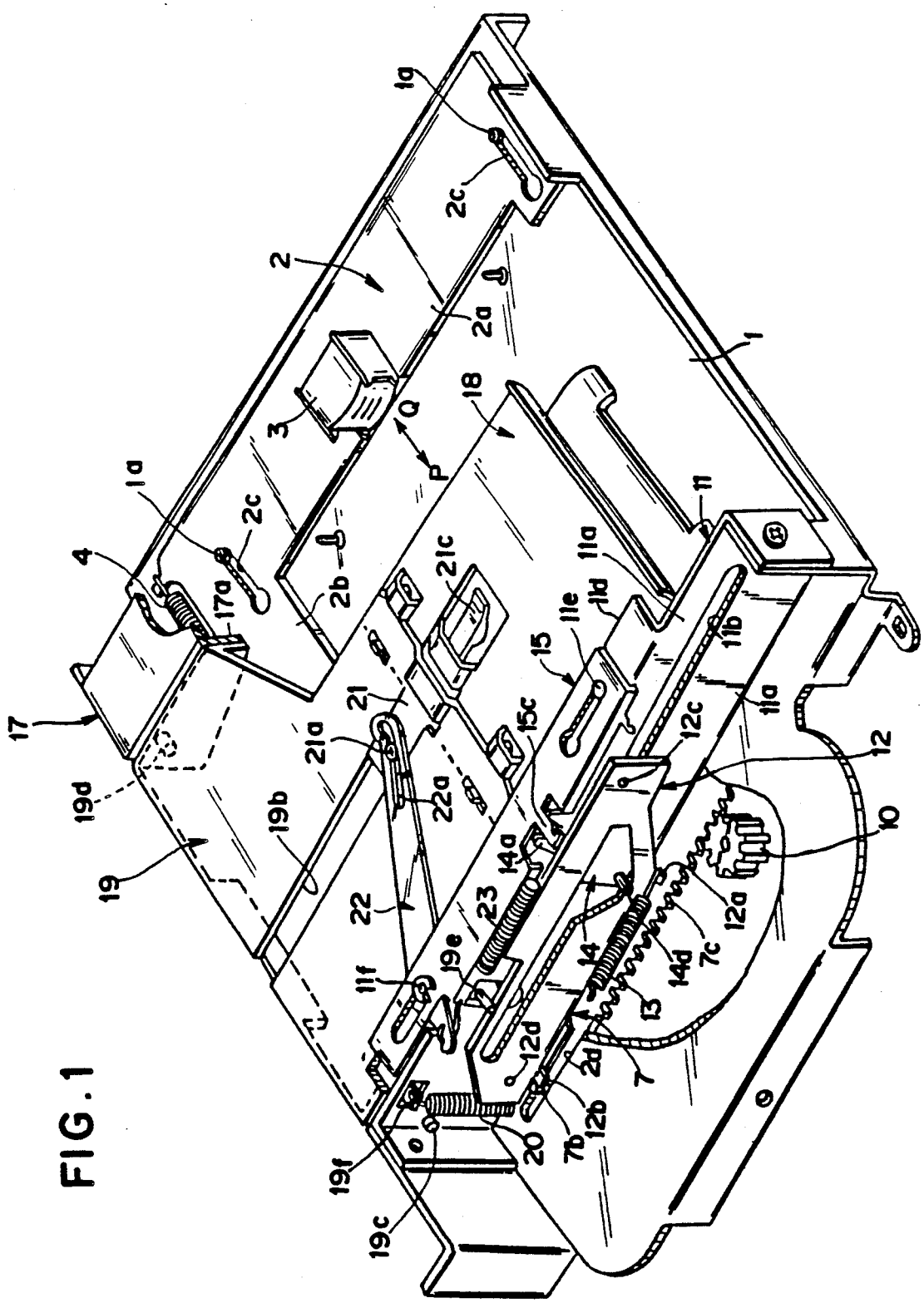
FIG. 1 is a perspective view partly cut-off of a driving device of a tape player which is an example of this invention.

FIGS. 1 to 13B show an embodiment of this invention. For the sake of convenience of the explanation, the construction of the mode switching mechanism will be explained at first.

In the figure, reference numeral 1 is a chassis and 2 is a head plate disposed on the front side of the chassis. This head plate 2 is formed approximately in a L-shape consisting of a plate portion 2a supporting a head 3 and a plate portion 2b bent at a right angle at an end thereof. It is disposed slidably in the mode switching direction indicated by an arrow P←→Q along guiding holes 2c formed at predetermined positions therein and pins 1a on the chassis side inserted in the guiding holes and energized in the direction indicated by P by a spring 4. Further, at the extremity of the plate portion 2b described above, for the purpose stated later, there is disposed a roller 5 at the extremity of a shaft 6 protruding on the rear side through a guiding hole 1b formed in the chassis.

On the rear side of the chassis 1 there is disposed a plate-shaped mode plate 7 (shift member), which can be moved in the direction A←→B perpendicular to the movement direction P←→Q of the head plate 2 e.g. by a reversible motor M for moving the head plate 2 described above. 2d and 2e are guiding holes formed in the chassis 1 for the purpose of guiding the movement of the mode plate, and 7a and 7b are pins on the mode plate side inserted therein, respectively.

On the mode plate 7 described above are formed stepwise a cam portion FF corresponding to the FF mode and a cam portion ST corresponding to the stop mode on one outer peripheral side, which is parallel to the movement direction A←→B so that the roller 5 disposed at the extremity of the plate portion 2b of the head plate 1 stated above can be engaged with the stepwise cam portions FF and ST of the mode plate 7.

Further a play position detecting cam portion PL' is formed at the other end of the mode plate 7. A cam portion FF' for detecting the position of the FF cam portion FF, a cam portion ST' for detecting the position of the stop cam portion ST and the cam portion EJ for detecting the eject termination are formed on the cut-groove-shaped inner peripheral side formed within the mode plate 7, which is parallel to the movement direction A←→B of the mode plate 7. In the neighborhood thereof along the movement direction of the mode plate, there are disposed a play position detecting switch $SW_d$ engaged directly with the play position detecting cam portion PL', an FF position detecting switch $SW_e$ engaged with the FF detecting cam portion FF' through a linking member 8 and a stop position detecting switch $SW_f$ engaged with the stop detecting cam portion ST' through a linking member 9. The switch $SW_e$ stated above is used also for detecting the loading-eject position of the cassette stated later and the switch $SW_f$ is used also for detecting the eject termination position of the mode plate 7.

The linking members 8 and 9 stated above are supported rotatably by supporting shafts 8a and 9a on a plate (not shown in the figure) separate from the chassis 1 and they have cam engaging portion 8b and 9b as well as switch engaging portion 8c and 9c, respectively.

Figure 3A:
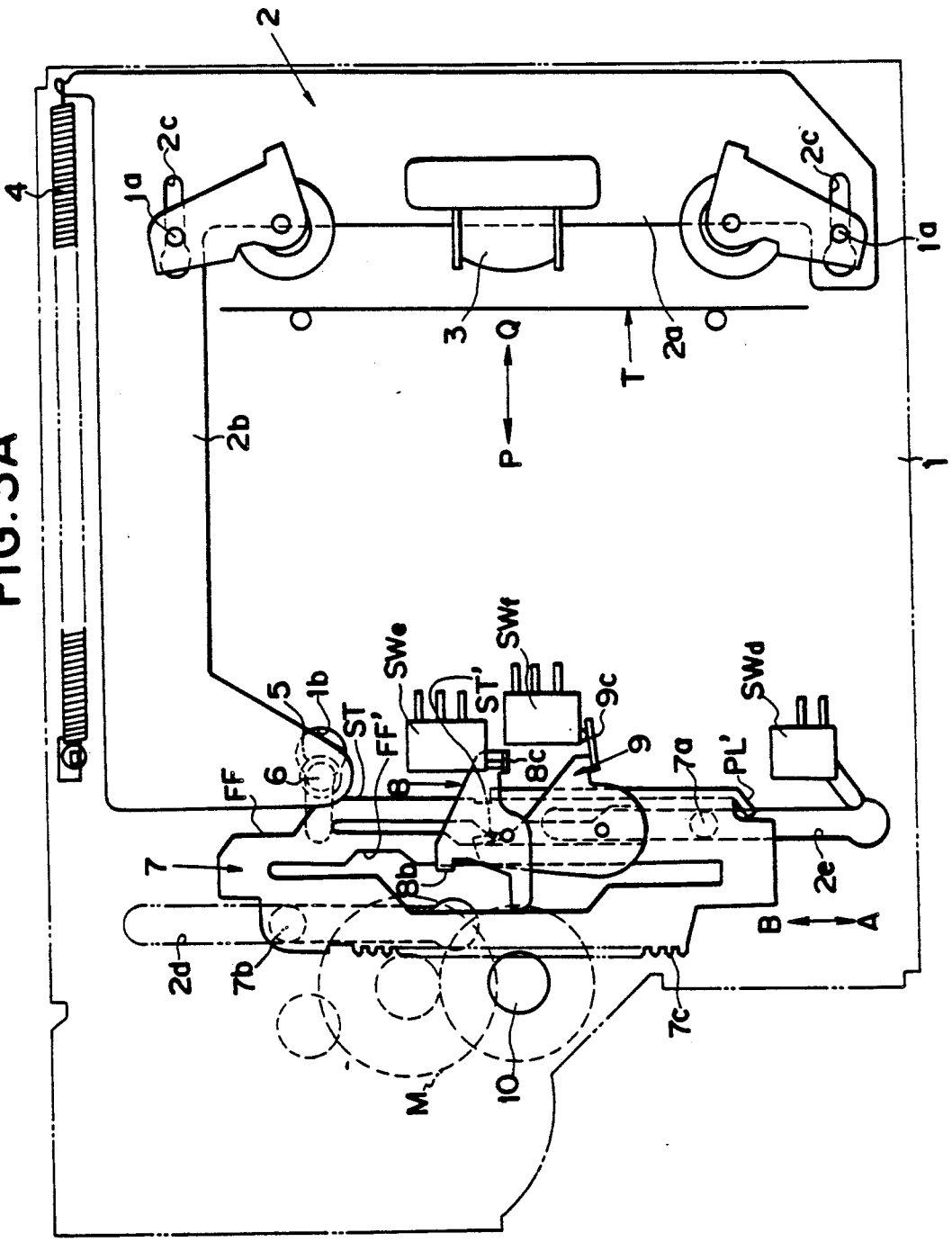
Figure 3C:
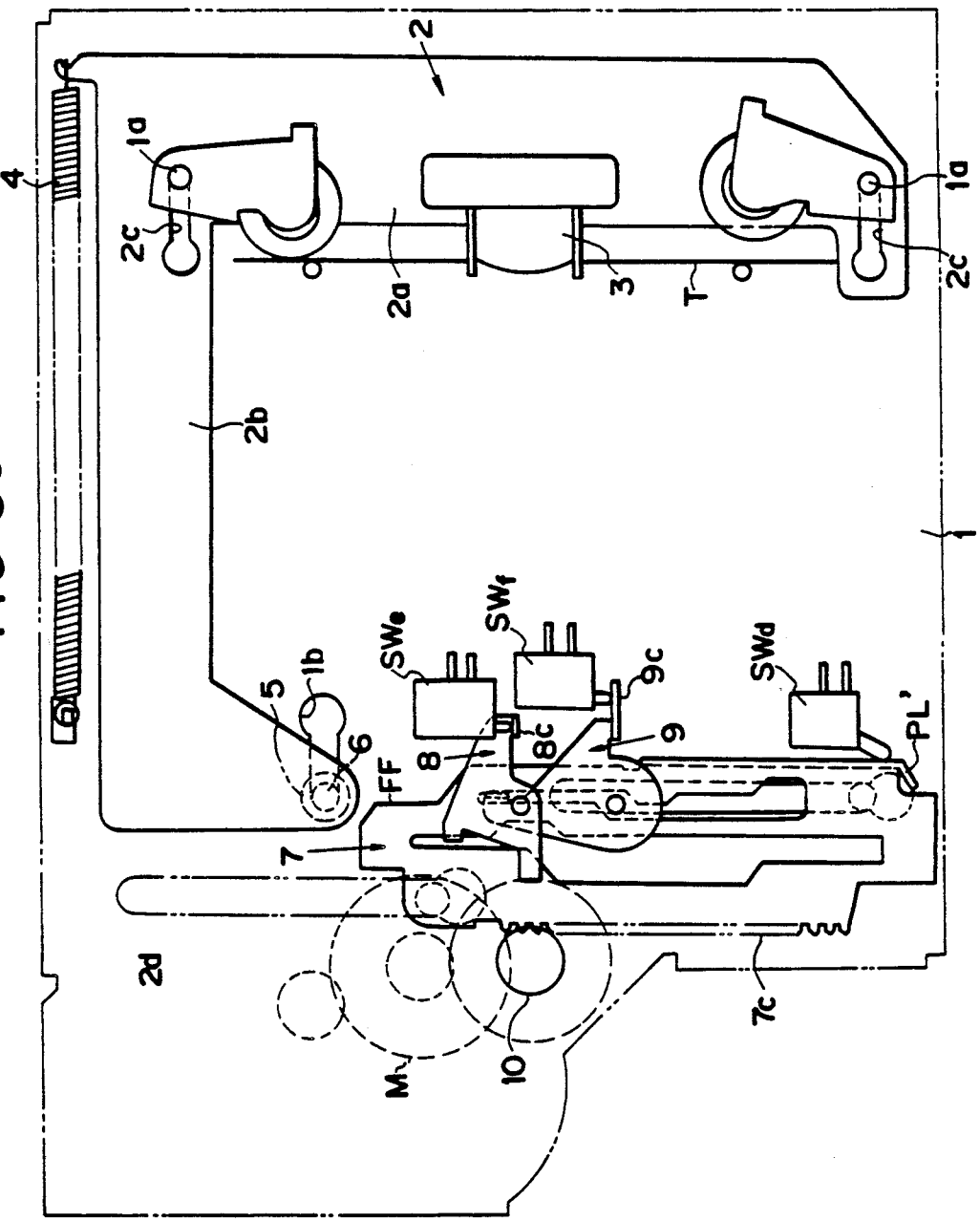

On the mode plate 7, a tooth-shaped portion 7c is formed on the peripheral side, which is opposite to the stepwise cam portions FF-ST and a power gear 10 of a reduction gear driven by the motor M disposed on the chassis 1. In FIGS. 3A to 3C, T represents a cassette tape.

The position detecting switches $SW_d$, $SW_e$ and $SW_f$ have energizing members such as springs in the interior thereof and act so as to push respective switch levers outward. A force rotating clockwise the linking members 8 and 9 engaged with the switches $SW_d$ and $SW_e$, respectively, act thereon in FIGS. 3A to 3C.

Next the operation and the movement of the mode switching mechanism having the construction described above will be explained.

FIG. 3A indicates a state, where the mode plate 7 is moved in the direction indicated by an arrow B by the power gear; the roller 5 of the head plate 2 is engaged with the stopping cam portion ST and in this way the head plate 2 is moved in the direction indicated by an arrow Q, i.e. the stop mode position.

At the stop mode position the engaging portion 9b of the linking member 9 is engaged with the stop position detecting cam portion ST' of the mode plate 7; the stop position detecting switch SW$_f$ is turned-on and the FF position detecting switch SW$_e$ is turned-off.

FIG. 3B indicates a state where the mode plate 7 is moved from the position illustrated in FIG. 3A in the direction indicated by an arrow A by the power gear 10; the roller 5 of the head plate 2 is engaged with the FF cam portion FF; and in this way the head plate 2 is moved in the direction indicated by an arrow P, i.e. the FF mode position. At this FF mode position the stop detecting switch SW$_f$ is turned-off and the FF position detecting switch SW$_e$ is turned-on.

FIG. 3C indicates a state where the mode plate 7 is moved from the position illustrated in FIG. 3A in the direction indicated by the arrow A by the power gear 10; the roller 5 of the head plate 2 is disengaged from the mode plate 7; the head plate is moved in the direction indicated by the arrow P; and in this way the shaft 6 is contacted with the end portion of the guiding hole 1b, i.e. the play mode position. At this play mode position, the stop position detecting switch SW$_f$ and the FF position detecting switch SW$_e$ are turned-off and the play position detecting switch SW$_f$ is turned-on.

FIG. 7 shows an example of the control circuit CL for starting and stopping the motor M stated above in the head shift and FIG. 8 is a flow chart therefor.

In FIG. 7, SW$_a$ is a play operation switch SW$_b$ is an FF operation switch; SW$_c$ is a stop operation switch; SIGNAL G is a signal for rotating the motor so as to move the mode plate 7 in the direction indicated by the arrow A; and SIGNAL H is a signal for rotating the motor so as to move the mode plate 7 in the direction indicated by the arrow B.

Further, although each of the switches is turned-on by grounding in the example indicated in FIG. 7, it may be turned-on by applying a voltage thereto.

For the FF position detecting switch SW$_e$, the stop position detecting switch SW$_f$, etc., depending on the relation to the control circuit, switches effecting on-off operations corresponding thereto may be selected arbitrarily to be used.

Then explanation of the construction of the cassette loading-eject mechanism is made, referring to FIGS. 1, 2, 9 and 10 in which reference numeral 11 indicates a frame disposed on the chassis 1. On a standing plate 11a constituting the frame there is disposed a loading-eject plate 12 movable in the same direction as the mode plate 7 on the rear side of the chassis parallely thereto. That is, the plate 12 is unified with the mode plate 7 by thrusting a lower side stopper piece on the plate 12 side on a pin 7b to hold it thereon owing to the energizing force of the spring 12 hooked between the pin 7b on the mode plate 7 side protruding through the guiding hole 2d formed in chassis 1 and a lower side protrusion 12a of the plate 12 stated above. Guiding holes 11b and 11c disposed on the standing plate 11a and pins 12e and 12d inserted therein guide the slide of the plate 12. A cut-groove-shaped cam portion 12e is disposed in the plate 12 for the purpose stated later.

On the other hand, between the standing plate 11a of the frame 11 and the frame 12 there is disposed a linking member 14 supported pivotably by means of a pivot 14d by the standing plate 11a. This linking member 14 includes a bifurcated portion 14a, a protruding axle portion 14b and a protruding piece portion 14c. The protruding axle portion 14b is engaged with the cut-groove-shaped cam portion 12e of the plate 12 stated above so that the linking member 14 is pivoted by the cam action thereof.

On a plate surface 11d of a receiving plate 11d bent at a right angle from the standing plate 11a of the frame 11 there is disposed an operation plate 15 so as to be slidably in the same direction as the loading-eject plate 12. Guiding holes 15a and 15b formed in this operation plate 15 and pins 11e and 11f on the receiving plate 11d side inserted therein guide the slide of the operation plate.

To the operation plate 15, there are secured protruding pieces 15c and 15d for hooking spring and a protruding piece 15e serving as a stopper at predetermined positions. The protruding piece 15c for hooking spring is inserted in the linking member 15 and the bifurcated portion 14a and a return spring 16 for the operation plate 15 is hooked between the protruding piece 15d and the protruding piece 11g disposed on the receiving plate 11d side.

Between the standing 11a of the frame 11 stated above and a standing plate 17a of another frame, which is opposite to the former with a predetermined distance, a guide arm 19 supporting a laid U-shaped pack guide 18 is supported rotatably. That is, 19a and 19b are side boards on the guide arm side, and 19c and 19d are pivots disposed on the side boards, respectively. These 19c and 19d are supported by the standing plates 11a and 17a by passing therethrough and thus they serve as fulcra for the rotation.

On the side board 19a, there is disposed a protruding axle 19e at its extremity and it is engaged with the cam portion 12f at the outer peripheral side of the loading-eject plate 12 through a cut-off portion 11h formed in the standing plate 11a. Further there is disposed a protruding piece 19f on the side board 19a, which gives the guide arm 19 an energizing force rotating it downward by a spring 20 hooked between the extremity thereof protruding through an opening 11i formed in the standing plate 11a and the chassis 1 side and at the same time thrusts the protruding axle 19e on the cam portion 12f of the plate 12.

On the guide arm 19, there is disposed a guiding groove 19g passing along the cassette insertion direction in the pack guide 18 and one end of a lever 22 is linked freely with a pack stopper 21 disposed slidably in the guiding groove 19g. That is, a pin 21a disposed on the pack stopper 21 is inserted in the guiding hole 22a on the lever 22 side. The other end of the lever 22 is inserted between the receiving plate 11d and the operation plate 15 and linked rotatably around a pin 11f on the receiving plate side serving as a pivot. A spring 23 is hooked between the end portion protruding outside of the operation plate 15 and the protruding piece 15c of the operation plate 15 stated above.

The pack guide 18 stated above is linked freely flexibly with the guide arm 19 and held thereby. The guide arm 19 is so constructed that, when it is rotated around pivots 19c and 19d, it is pushed thereby to be moved downward.

Now the operation and the movement of the loading-eject mechanism will be explained.

(1) As indicated in FIGS. 11A and 11B, when the cassette 24 is inserted in the pack guide 18, until the extremity thereof touches a stopper plate 21b of the pack stopper 21, an engaging element 21c of the pack stopper 21 is engaged with a hub hole (not shown in the figure) on the cassette side.

(2) When the cassette is slightly pushed from the insertion position, since the pack stopper 21 is thrusted in the direction indicated by an arrow C and the lever 22 is rotated around the pin 11f in the direction indicated by an arrow D, the operation plate 15 is moved in the direction indicated by an arrow E.

Figure 2:
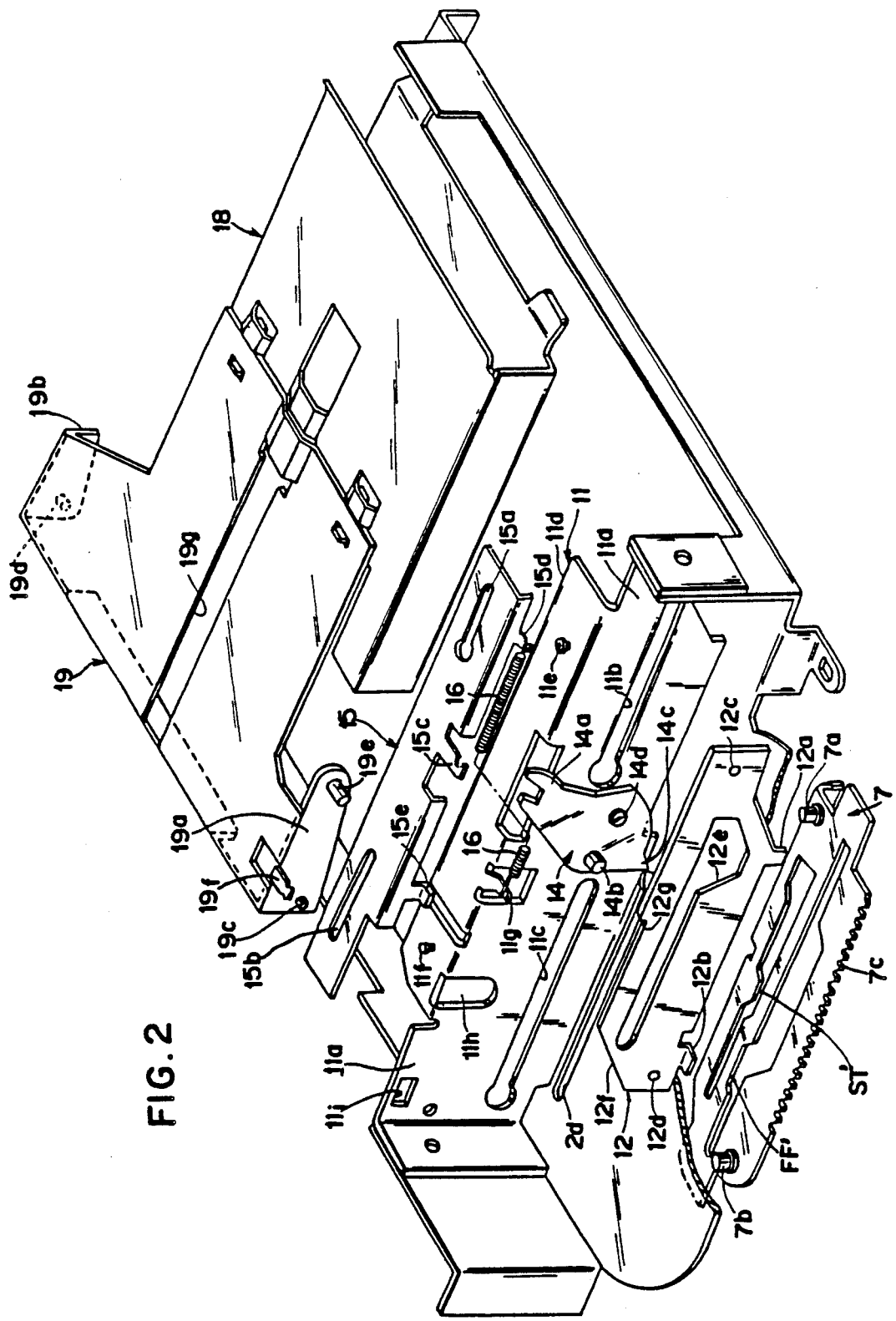
FIG. 2 is an exploded perspective view of the same device.

(3) Since the linking member 14 linked with the protruding piece 15 of the operation plate 15 is rotated clockwise around the pivot 14d in FIG. 2 by the movement of the operation plate 15 and the protruding piece 14c is moved, the linking member 14 is rotated clockwise and the lever of the switch $SW_e$ is moved from the state, where it is pushed farthest, to its intermediate position. By this movement the motor M is started and the loading begins.

Further, the movement of the operation plate 15 is stopped by the fact that the protruding piece 15e thereof is engaged with a step portion 12g of the loading-eject plate 12. However, since the plate 12 is moved in the direction indicated by an arrow F by the start of the motor M, the stopping action described above is removed.

(4) That is, when the motor is started, as it has been already explained, referring to FIGS. 1 and 3A, the mode plate 7 is moved in the direction indicated by the arrow A by the power gear. However, since the loading-eject plate 12 is linked with the mode plate 7 stated above as one body, the plate 12 is moved in the direction indicated by the arrow F.

(5) When the plate 12 stated above is moved in the direction indicated by the arrow F, since the protruding axle portion 14b of the linking member 14 engaged with the bottom portion of the cut-groove shaped cam portion 12e is moved along the rising slanting surface of the cam portion 12e, the linking member 14 continues also to rotate clockwise (refer to FIG. 2) and the operation plate 15 linked therewith is moved further in the direction indicated by the arrow E. At the same time, the lever is also rotated in the direction indicated by the arrow D and the horizontal pull-in of the cassette 24 is effected by the pack stopper 21.

Figure 12A:
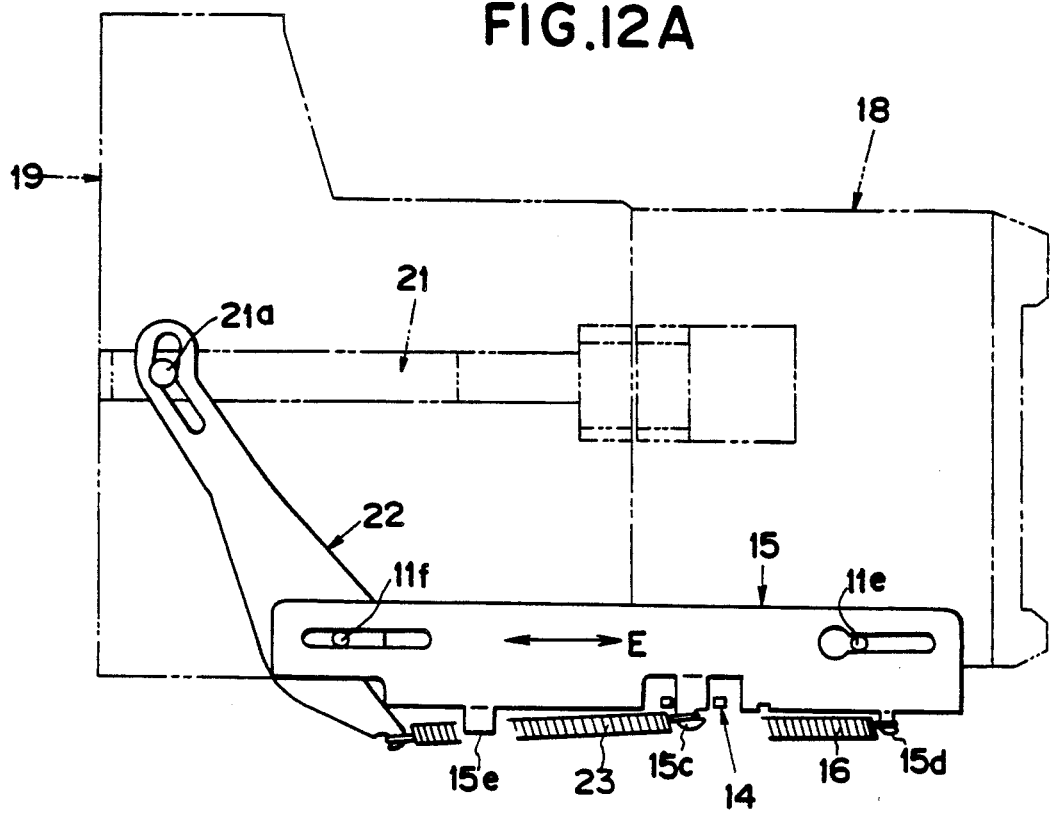
Figure 12B:
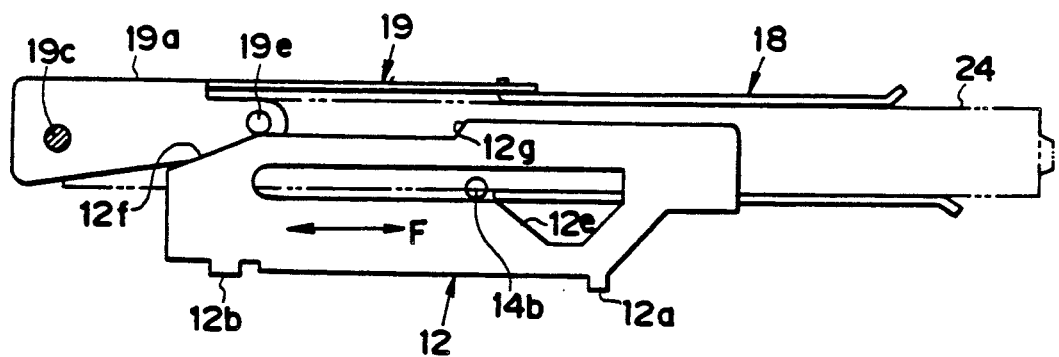
FIG. 12B is a side view thereof.

(6) FIGS. 12A and 12B indicates a state where the pull-in of the cassette is terminated.

At the point of time, where the pull-in of the cassette is terminated, since the protruding axle portion 14b of the linking member 14 runs on to the top portion of the cam portion in plate 12 and the rotation of the linking member 14, the movement of the operation plate 15 is stopped.

Further, at the point of time, where the cassette pull-in is terminated, the protruding axle 19e of the side board 19a of the guide arm 19 is at the extremity of the horizontal top portion (refer to FIG. 12B) of the cam portion 12f at the outer peripheral side of the plate 12 stated above.

Figure 13A:
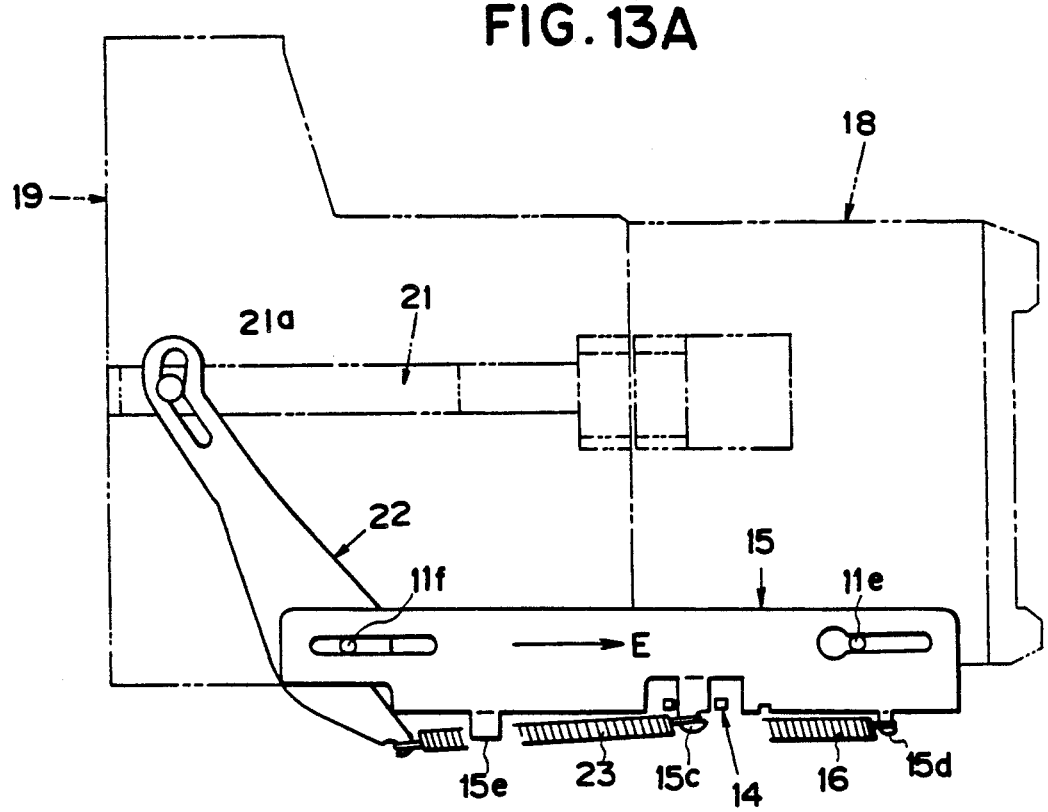
FIG. 13A is a plan view of the loading mechanism at the cassette descent.
Figure 13B:
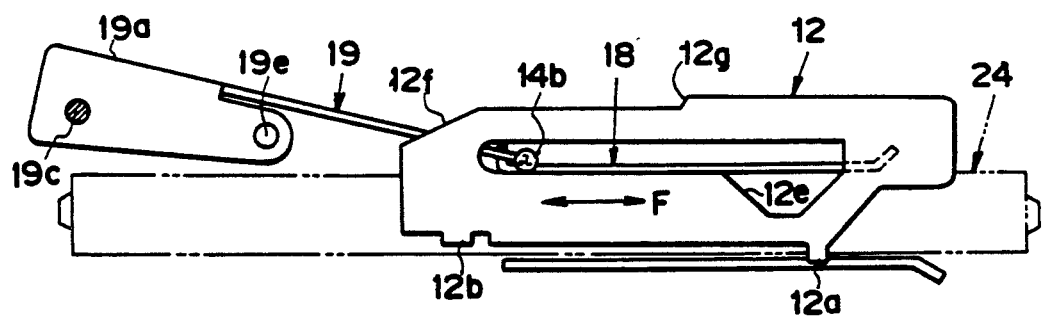
FIG. 13B is a side view thereof.

(7) FIGS. 13A and 13B indicates a state, where the cassette 24 is descended, after the cassette has been pulled-in.

Since the loading-eject plate 12 continues to be moved in the direction indicated by the arrow F, driven by the motor M, even if the movement of the operation plate 15 is stopped, the protruding axle 19e on the side board 19a side of the guide arm 19, which has been supported by the horizontal top portion of the cam portion on the plate 12, is detached from the horizontal top portion and the guide arm 19 is rotated clockwise (FIG. 13B) around the pivot 19c by the energizing force of the spring 20 (refer to FIG. 1), as long as it is guided along the descending slanting surface of the cam portion 12f. Consequently, as indicated in FIG. 13B, the pack guide 18 descends in a state, where it supports the cassette.

Further, the protruding axle 19e of the side board 19a stated above, which has been detached from the descending slanting surface of the cam portion 12f in the plate 12, is received by the cut-off portion 11h of the frame standing plate 11a, as it is.

(8) At the point of time, where the cassette 24 has been descended by the pack guide 18 stated above, the mode plate 7 described previously is at the stop mode position indicated in FIG. 3A. In this way, when the mode plate is moved to the play position indicated in FIG. 3C by the power gear 10, the position detecting switch $SW_f$ stated previously is turned-on and the movement of the mode plate 7 is stopped by the stop of the motor M.

During the movement of the mode plate 7 after the descent of the cassette, the loading-eject plate 12 is only moved together with the mode plate 7 in the direction indicated by the arrow F and has no influences on the other members.

(9) Then, in the case where the eject of the cassette is effected, the switch for the eject (not shown in the figure) is turned-on and the motor M is driven in the reverse direction.

When the motor is driven in the reverse direction, the operation, which is reversed with respect to that described for the loading, is performed and each of the members is returned from the state indicated in FIGS. 13A and 13B to that indicated in FIGS. 11A and 11B.

At this time, the mode plate 7 reaches the movement termination position (FIG. 3A) and the linking member 9 is rotated by the movement of the engaging portion 9b thereof to the eject termination position. The motor M is stopped by the fact that the lever of the switch $SW_f$ is moved from the intermediate position to the outermost side and thus the eject is terminated.

Further, although, in the above embodiment, the mode plate and the loading-eject plate fabricated separately is coupled in one body, these two members may be formed as one shift member.

Figure 14:
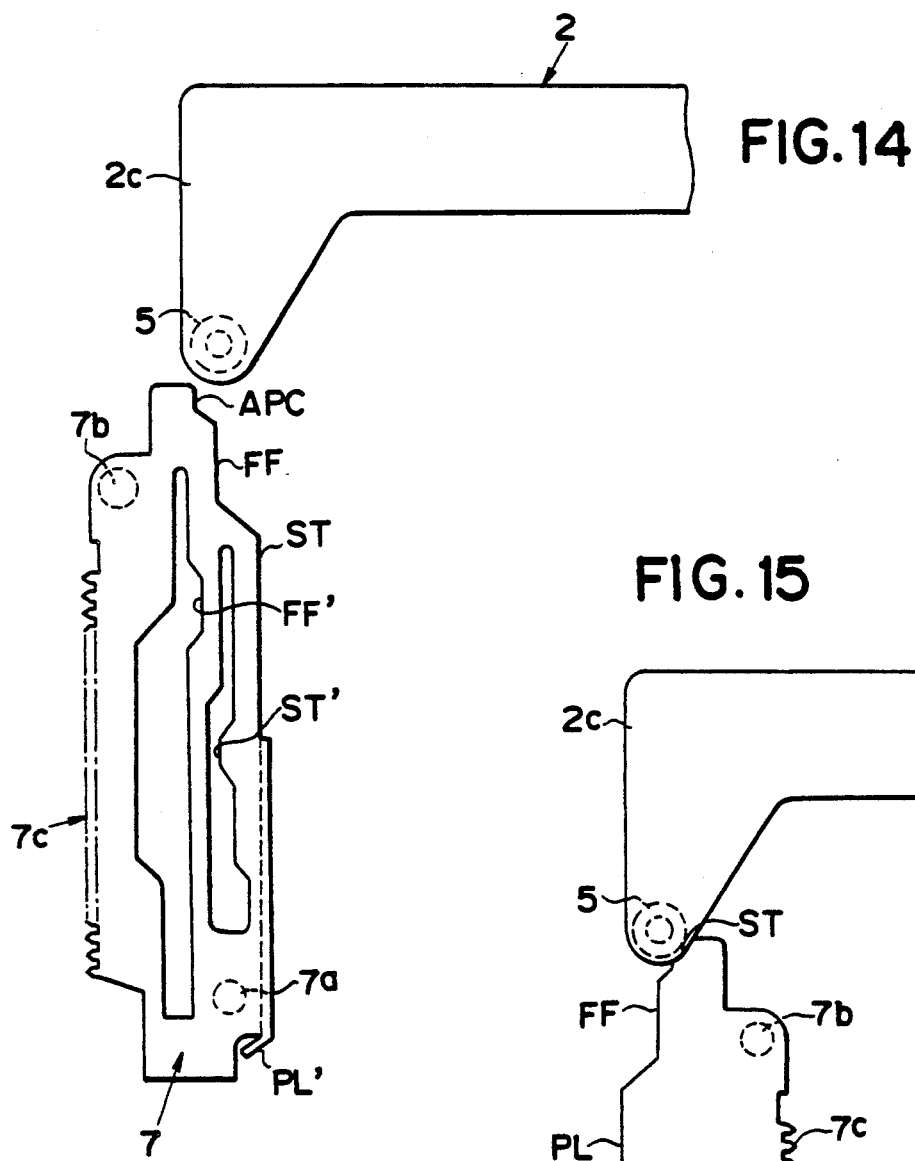
FIGS. 14 to 20 illustrate another embodiment of the mode switching mechanism in a tape player according to this invention.

Another embodiment of the mode switching mechanism according to this invention is indicated in FIG. 14, in which the shift member 7 has no cam portion of the play mode, but an escape position distant from the shift member is the play mode position, and in lieu thereof a cam portion APC corresponds to the queuing mode.

Figure 15:
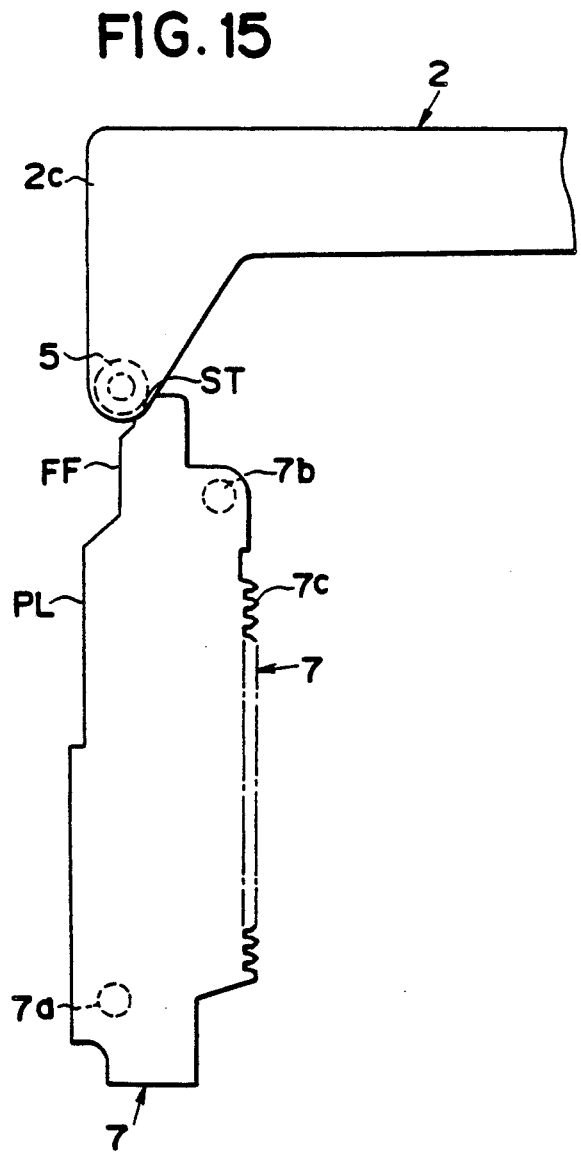

Although, in the embodiment described above, the cam portion PL, FF and ST are formed at the peripheral side portion, which is opposite to the head n the head plate 2, they may be so constructed that the cam portion is formed on the opposite peripheral side, as indicated in FIG. 15, and it is engaged with the roller 5 on the head plate side by an energizing force in the direction opposite to that of the spring 4 indicated in FIG. 3A.

Figure 16:
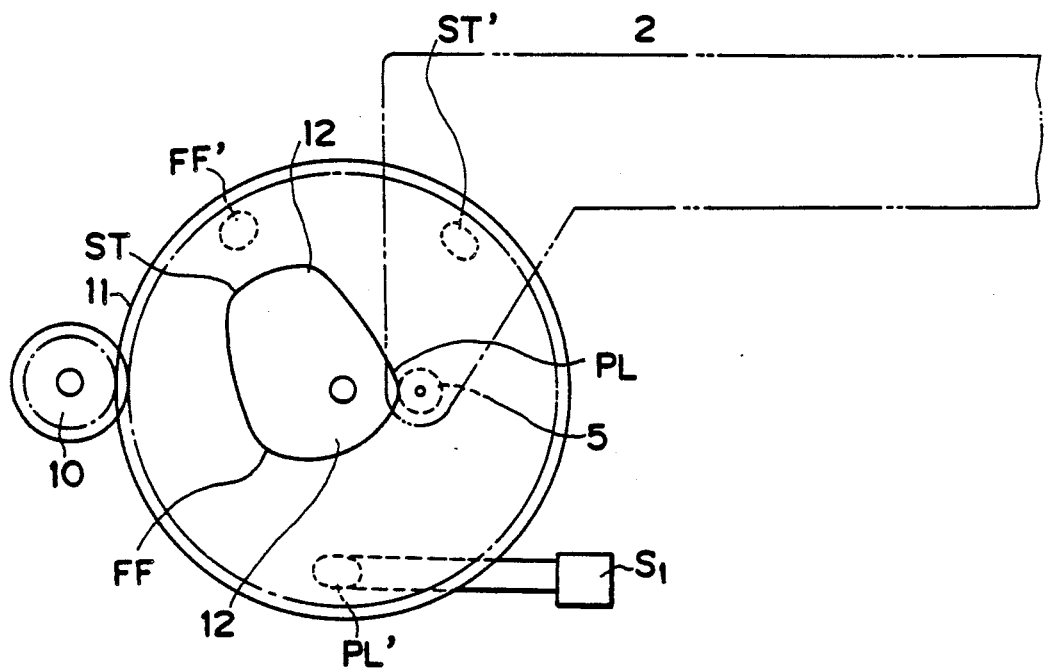
Figure 17:
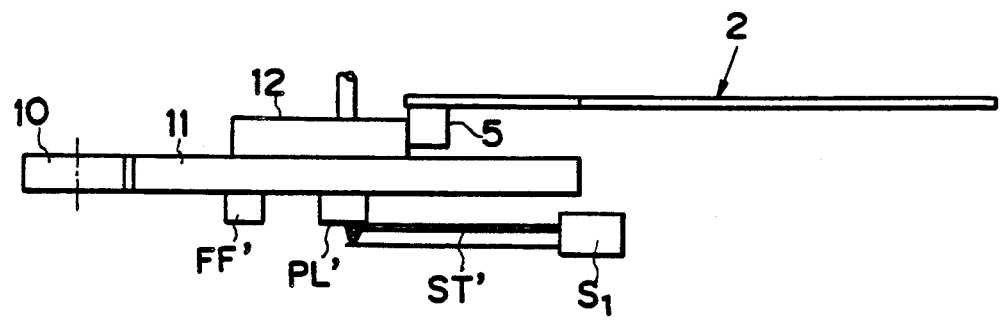
Figure 18:
Figure 19:
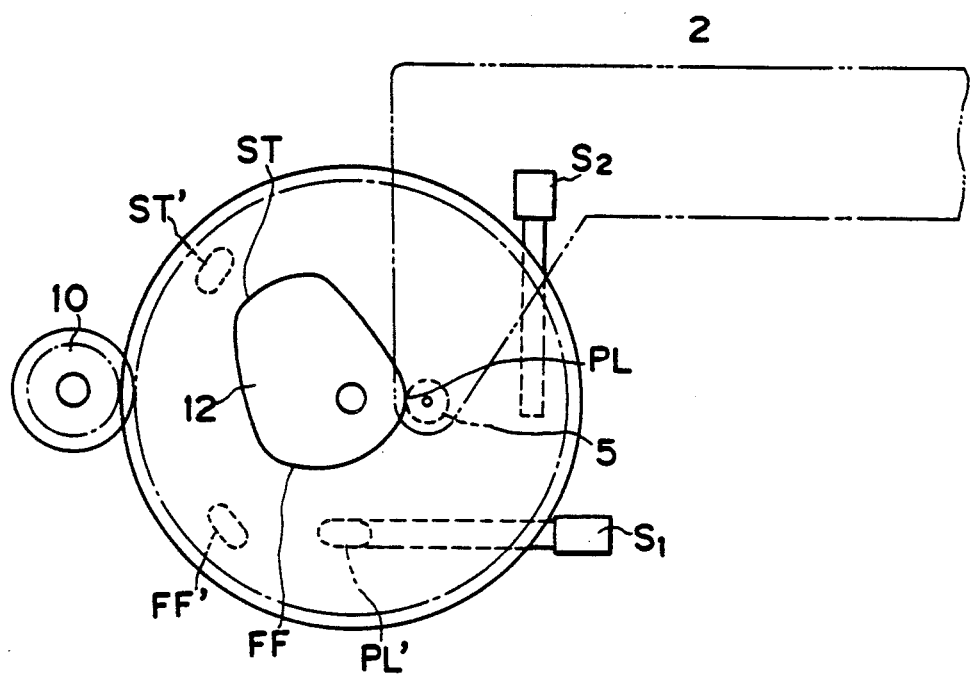
Figure 20:
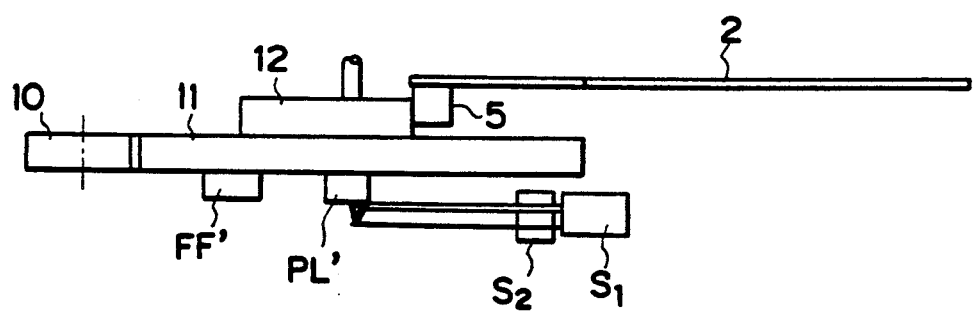
Figure 22:
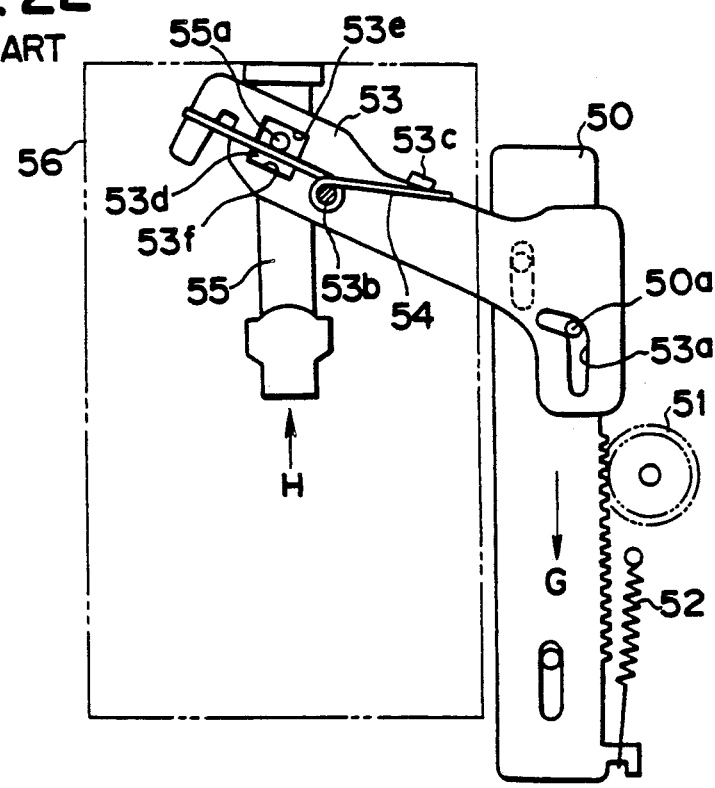
FIG. 22 shows the loading-eject mechanism in a prior art tape player.

FIGS. 16 to 18 indicate examples in which the head plate is moved by the rotating cam.

In these figures the members identical or similar to those described already are represented by the same reference numerals.

That is, reference numeral 10 represents the power gear, with which the shift gear 11 replacing the shift member is engaged, and a cam body 12 is mounted on the shaft of the shift gear 11. On the cam body 12 are formed the play cam portion PL, the FF cam portion FF and the stop cam portion ST so that the roller 5 on the head plate 2 side is engaged therewith. On the other hand, on the shift gear 11, at the same radial direction position, are formed the play position detecting cam portion PL', the FF position detecting cam portion FF' and a stop position detecting cam portion ST', which are formed in a convex shape, and there is disposed a limit switch for these position detecting cam portions so that it is engaged therewith in common.

In a mode switching device having the construction described above, the head plate 2 is moved to either one of the mode positions corresponding to the play cam portion PL, the FF cam portion FF and the stop cam portion ST constituting the cam body 12 linked with the shift gear 11 in one body by the rotation thereof. On the other hand, the limit switch described above is kept in the OFF state at the position other than the position detecting cam portions PL'-FF'-ST' and the rotational position of the cam body can be judged by detecting the direction of the rotation of the motor and the number of times of the turning-on of the switch.

Although, in the above embodiment, an example, in which the cam positions are detected by one limit switch, is shown, it may be so constructed that a limit switch $S_1$ is engaged with the play position detecting cam portion PL and another limit switch $S_2$ is engaged in common with the FF position detecting cam portion FF' and the stop position detecting cam portion ST', which is disposed at a radial position differing from that of the former.

Further it may be also so constructed that the position detecting cam portions PL', FF' and ST' are disposed, shifted from each other in their radial position and a limit switch is made correspond to each of the cams. In addition, the motor driving the shift member is not restricted to reversible one.

Figure 21:
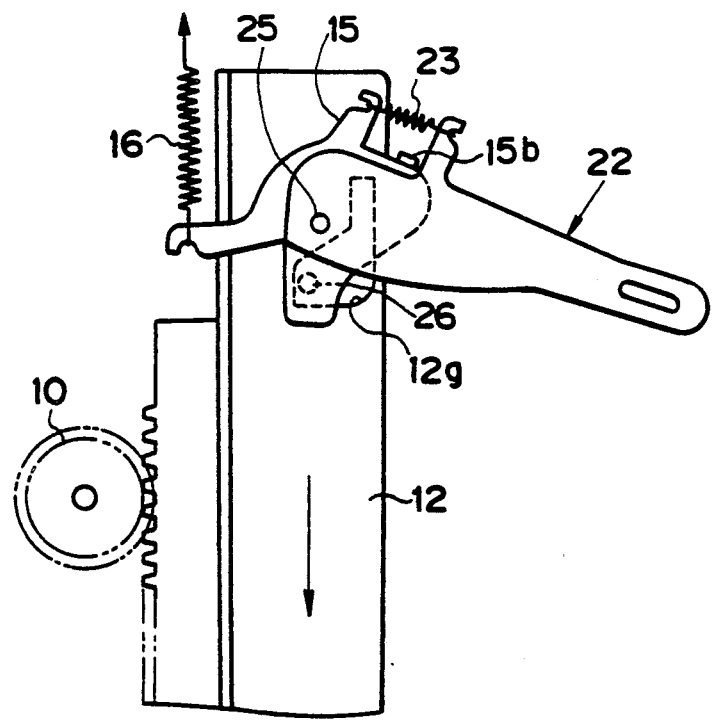
FIG. 21 indicates the principal part of an embodiment of the loading-eject mechanism in a tape player according to this invention.

FIG. 21 shows the principal part of still another embodiment of the loading-eject mechanism according to this invention, in which the members identical or similar to those described above are indicated by the same reference numerals. That is, reference numeral 12 is the loading-eject plate; 10 is the power gear engaged with a toothed portion in the plate; 22 is the lever member; and 15 is the moving member. The lever member 22 and the moving member 15 are supported by separate members (not shown in the figure) in a state, where they are rotatably around the shaft 25 with respect to each other. An energizing force around the shaft 25 is given to the lever member 22 and the shifting member 15 by a spring hooked therebetween. The lever member 22 and the shifting member 15 are held, linked with each other, at an angular position, where they are engaged with the stopper 15b on the shifting member 15 side, and the pin 26 disposed on the moving member 15 is inserted in the guiding hole 12g formed in the loading-eject plate 12. One end of the return spring 16 is mounted on the extremity of the lever member 15.

In the mechanism described in the above embodiment, when the loading-eject plate 12 is moved in the direction indicated by the arrow at the loading operation, the moving member 15 is rotated counterclockwise by the engaging action between the pin 26 and the guiding hole 12g on the plate side. Since the lever member 22 linked therewith through the spring 23 is rotated also counterclockwise, the cassette (not shown in the figure) linked with the lever member 22 is pulled-in. Even if the cassette is caught by hand at this loading, just as in the embodiment described above, since only the spring 23 is extended and the loading operation is continued, there are no influences on the other members.

In the same way, if a protrusion 12h similar to the protrusion 7d described previously is disposed also on the horizontal cam portion contiguous to the upper end of the slanting cam portion 12f of the loading-eject plate 12 stated above, it is useful for preventing the rotation of the motor due to vibrations, etc., because it serves as a resisting portion against the protruding axle 19e on the guide arm 19 side described above.

Figure 23:
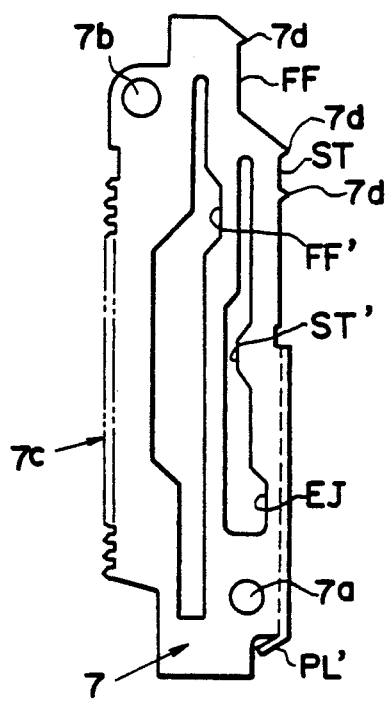
FIGS. 23 and 24 show the principal part of still another embodiment of the mode switching mechanism and the loading-eject mechanism in a tape player according to this invention.
Figure 24:
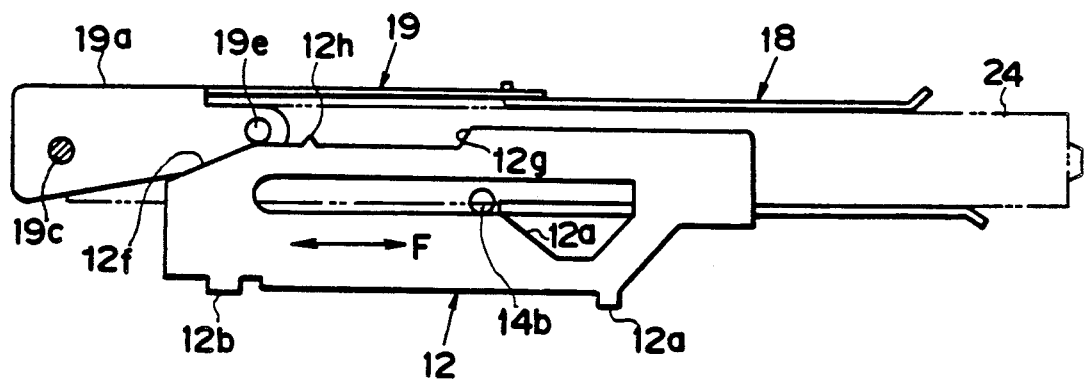

In addition, in the tape player according to this invention, it is desirable to dispose a protruding portion on the cam portion, as indicated in FIG. 23, in order to prevent positional displacements of the shift member. That is, although the mode plate 7 (shift member) is stopped at its moving position by the fact that the motor driving it is stopped by a signal of the respective detecting switch for detecting the operation position of the plate, since a small protrusion 7d id disposed at a predetermined position on the cam portion of the mode plate 7, the mode plate 7 is held at its operation position without any influences of the rotation due to vibrations, etc. after the stop of the motor. Further, since the protrusion 7d described above, it is possible for the roller 5 to surmount it at the movement of the mode plate 7 and therefore the displacement of the mode plate is never hindered.

As indicated above, since the tape player according to this invention is so constructed that the loading-eject mechanism for the cassette and the mode switching mechanism for the head are driven by moving only one shift member linked with the power gear driven by the motor, it can be expected to simplify remarkably the operating mechanism of the tape player.

Further, with respect to the prior art mechanism, by which the modes are switched by means of a mechanism such as plungers, etc., since mechanical parts are only one shift member and a mechanism linking the head plate therewith and the other parts can be constructed by an electrical circuit, which starts and stops the motor, it is possible to obtain a device for driving a tape player without working noise.

What is claimed is:

1. A tape player comprising:
   a head plate disposed slidably, supporting a magnetic head;
   a shift member engaged slidably with said head plate, having a cam which has a cam portion corresponding to each of the operation mode positions, and disposed movably;
   a power gear driven by a motor to move said shift member and to make said head plate slide to a desired operation mode position; and
   position detecting means for detecting that said shift member has been moved and arrived at a desired operation mode position;

wherein there is formed a protrusion on at least one predetermined portion of said cam, which gives a small resistance to the slide of said shift member.

2. A tape player comprising:

a head plate disposed slidably, supporting a magnetic head;

a shift member engaged slidably with said head plate, having a cam which has a cam portion corresponding to each of the operation mode positions, and disposed movably;

a power gear driven by a motor to move said shift member and to make said head plate slide to a desired operation mode position, driving means for driving a loading-eject mechanism for a cassette by movement of said shift member; and position detecting means for detecting that said shift member has been moved and arrived at a desired operation mode position or loading-eject position;

wherein said driving means includes an engaging member for engaging it with said shift member, said engaging member being provided with the cam engaged with said loading eject mechanism, and there is formed a protrusion on at least one predetermined portion of said cam, which gives a small resistance to the movement of said loading-eject mechanism.

3. A tape player comprising:

a head plate disposed slidably, supporting a magnetic head;

a shift member engaged slidably with said head plate, having a cam which has a cam portion corresponding to each of the operation mode positions, and disposed movably;

a power gear driven by a motor to move said shift member and to make said head plate slide to a desired operation mode position;

driving means for driving a loading-eject mechanism for a cassette by movement of said shift member; and position detecting means for detecting that said shift member has been moved and arrived at a desired operation mode position or loading-eject position;

wherein there is formed a protrusion on at least one predetermined portion of said cam, which gives a small resistance to the slide of said shift member.

4. A tape player according to claim 3, wherein said position detecting means includes members, each of which is engaged with each of said portions of said cam portion, each of the operation mode positions and the loading-eject position being detected by said members.

5. A tape player according to claim 3, wherein said driving means comprises:

a pack guide supporting movably an inserted cassette;

a pack stopper for pulling-in said cassette inserted in said pack guide to a loading termination position;

a moving member coupled with said shift member, which is moved in a predetermined direction, responding to a loading operation; and a lever member having a pivot, one end thereof being coupled with said pack stopper, the other end thereof being coupled with said moving member through a spring.

6. A tape player according to claim 3, wherein said driving means comprises:

a guide arm making the cassette ascend and descend;

a pack stopper pulling-in and ejecting the cassette;

a reversible motor;

a moving member for starting said motor by the insertion of said cassette;

a lever member having a pivot, one end thereof being coupled with said pack stopper, the other end thereof being coupled with said moving member through a spring; and a loading-eject member moving said moving member by the moving of said shift member to make said guide arm ascend and descend together with the cassette.

7. A tape player comprising:

a head plate disposed slidably, supporting a magnetic head;

a movably supported shift member engaged slidably with said head plate, and having formed thereon a plurality of cam portions which each correspond to a respective operation mode position;

a power gear driven by a motor to move said shift member so that said head plate is made to slide to a desired operation mode position;

driving means for driving a loading-eject mechanism for a cassette in response to movement of said shift member to a loading-eject position; and position detecting means for detecting that said shift member has been moved and has arrived at a desired one of said operation mode positions or said loading-eject position;

wherein said position detecting means includes members which each engage one of said cam portions in each of said operation mode positions of said shift member, each of the operation mode positions and the loading-eject position being detected by said members and said position detecting means generating in response thereto a control signal identifying the detected position.

8. A tape player comprising:

a head plate disposed slidably, supporting a magnetic head;

a shift member engaged slidably with said head plate, having a cam which has a cam portion corresponding to each of the operation mode positions, and disposed movably;

a power gear driven by a motor to move said shift member and to make said head plate slide to a desired operation mode position;

driving means for driving a loading-eject mechanism for a cassette by movement of said shift member; and position detecting means for detecting that said shift member has been moved and has arrived at a desired operation mode position or loading-eject position;

wherein said position detecting means includes members, each of which is engaged with each of said portions of said cam, each of the operation mode positions and the loading-eject position being detected by said members; and wherein there is formed a protrusion on at least one predetermined portion of said cam, which gives a small resistance to the slide of said shift member.

* * * * *